(12) United States Patent
Thomas

(10) Patent No.: US 7,004,832 B2
(45) Date of Patent: Feb. 28, 2006

(54) COLLAPSIBLE AIR VENT CLOSURE

(76) Inventor: Allen C. Thomas, 5513 W. Sligh Ave., Tampa, FL (US) 33634

( * ) Notice: Subject to any disclaimer, the term of this patent is extended or adjusted under 35 U.S.C. 154(b) by 0 days.

(21) Appl. No.: 10/858,884

(22) Filed: Jun. 2, 2004

(65) Prior Publication Data

US 2005/0003751 A1 Jan. 6, 2005

Related U.S. Application Data

(60) Provisional application No. 60/475,350, filed on Jun. 2, 2003.

(51) Int. Cl.
*B60H 1/24* (2006.01)
(52) U.S. Cl. .......................... 454/94; 454/129; 454/136
(58) Field of Classification Search ................... 454/94, 454/129, 136, 349, 354, 367; 296/216.01, 296/217

See application file for complete search history.

(56) References Cited

U.S. PATENT DOCUMENTS

| | | | |
|---|---|---|---|
| 787,997 A | 4/1905 | Taylor et al. | |
| 1,944,321 A | 1/1934 | Huxter | |
| 2,372,164 A | * 3/1945 | Woodhams | .................. 454/94 |
| 2,460,604 A | 2/1949 | Simcox | |
| 3,587,443 A | * 6/1971 | Rapport | ...................... 454/136 |
| 3,934,383 A | 1/1976 | Perry et al. | |
| 4,038,911 A | 8/1977 | Hart | |
| 4,395,939 A | * 8/1983 | Hough et al. | ............... 454/129 |
| 4,615,263 A | 10/1986 | Titterud | |
| 4,633,769 A | 1/1987 | Milks | |
| 4,702,518 A | * 10/1987 | Paerisch et al. | ............ 296/217 |
| 4,867,047 A | 9/1989 | Citron | |
| 5,020,425 A | 6/1991 | Kelly | |
| 5,038,674 A | * 8/1991 | Merges | ....................... 454/136 |
| 5,054,377 A | 10/1991 | Mochel et al. | |
| 5,156,568 A | * 10/1992 | Ricci | ........................... 454/129 |
| 5,374,215 A | 12/1994 | Crider et al. | |
| 5,797,791 A | 8/1998 | Humphrey et al. | |
| 5,918,972 A | 7/1999 | Van Belle | |
| 6,068,551 A | 5/2000 | Oremland | |
| 6,106,385 A | 8/2000 | Humphrey et al. | |
| 6,468,147 B1 | 10/2002 | Thomas | |

FOREIGN PATENT DOCUMENTS

GB 2 042 626 * 9/1980 ................. 454/136

OTHER PUBLICATIONS

Fan-Tastic Vent Model 6000A Installation and Operating Instruictions. Fantastic Vent, 2083 S. Almont Ave. Imlay City, MI 48444 6002-FTVRV 1-98.

* cited by examiner

*Primary Examiner*—Harold Joyce
(74) *Attorney, Agent, or Firm*—Frijouf, Rust & Pyle, P.A.

(57) ABSTRACT

A collapsible air vent closure is disclosed comprising a frame having a frame aperture. A closure is mounted to the frame for pivoting between a closed position and an open position. A movable vent wall having a vent orifice is interposed between the frame and the closure. The vent orifice provides an air flow path to the frame aperture when the closure is in the open position. The closure inhibits the air flow path to the frame aperture when the closure is in the closed position.

22 Claims, 13 Drawing Sheets

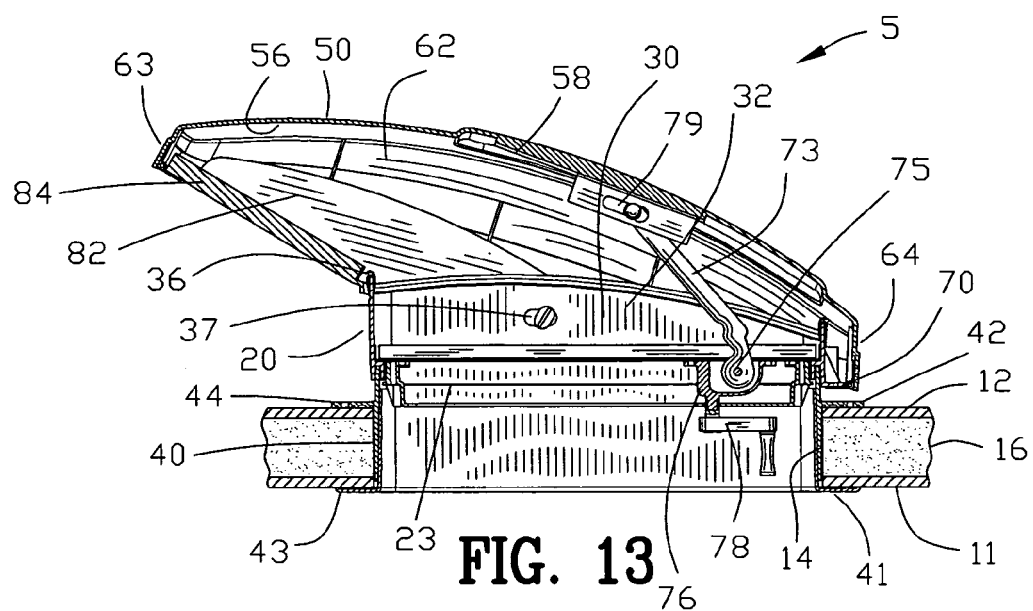
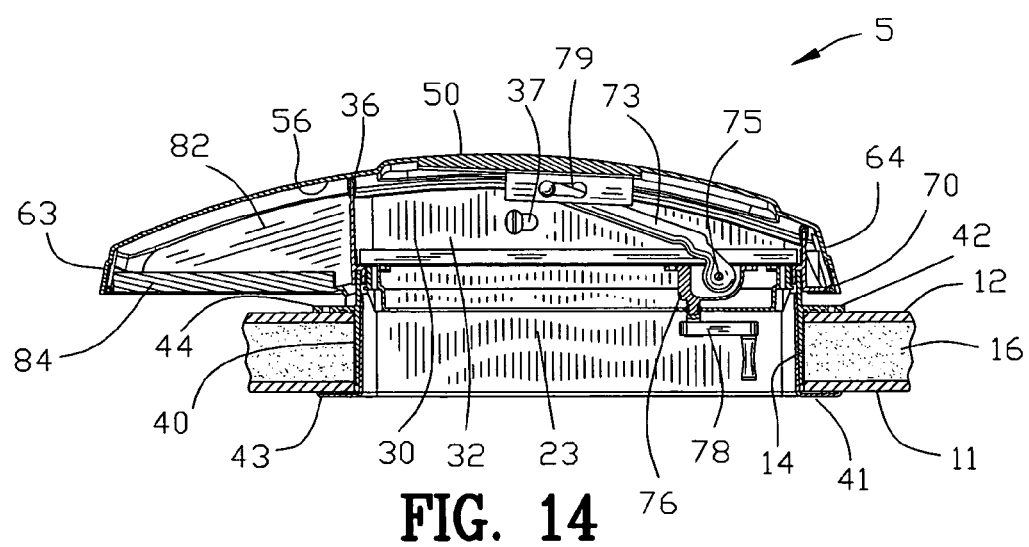

COLLAPSIBLE AIR VENT CLOSURE

CROSS-REFERENCE TO RELATED APPLICATIONS

This application claims benefit of U.S. Patent Provisional application Ser. No. 60/475,350 filed Jun. 2, 2003. All subject matter set forth in provisional application Ser. No. 60/475,350 is hereby incorporated by reference into the present application as if fully set forth herein.

BACKGROUND OF THE INVENTION

1. Field of the Invention

This invention relates to ventilation of a structure and more particularly to an improved collapsible air vent closure for a structure such as a recreational vehicle, boat or the like.

2. Description of the Related Art

Ventilation is the process of supplying or removing air by mechanical or natural means to a structure. This process is required for the removal of such impurities as products of human respiration and perspiration as well as gaseous products of combustion from stoves, combustion heaters and the like. Although carbon monoxide contents of 1% or more in the air are not harmful, somewhat higher levels of carbon monoxide present significant health hazards to occupants of enclosed structures.

Natural ventilation is the result of wind action. A slight positive pressure is developed on the windward side of a structure relative to the pressure on the leeward side. Recreational and other vehicles contain air vent openings to facilitate the entry of fresh air into the vehicle. These openings are typically located on a top horizontal surface and on side vertical surfaces. Since the action of the wind is variable being dependent upon wind speed and direction as well as vehicle speed and direction relative to the wind, the control of the amount of air admitted to a structure or a vehicle presents a problem to those skilled in the art. Another problem associated with establishing and maintaining ventilation in a structure is the intrusion of precipitation by means of the air ventilation flow path.

Various types of air vent devices have been used by the prior art for venting and/or circulating air. The air vent devices of the prior art are found in building structures, boats, airplanes, land vehicles and the like. Many of the air vent devices of the prior art were located in a roof of a recreational vehicle, boat or the like.

The typical air vent device located in a roof of a recreational vehicle, boat or the like comprised a frame having a frame aperture. A screen was located within the frame aperture for ventilating the recreational vehicle, boat or the like. A closure was pivotably attached to the frame for movement between an open and a closed position.

When the closure was in the closed position, the closure was moved to be generally parallel to the roof of the recreational vehicle, boat or the like to close the frame aperture. When the closure was in the open position, the closure was angularly disposed relative to the roof of the recreational vehicle, boat or the like to open the frame aperture. Unfortunately, the closure had to be closed during inclement weather to avoid precipitation form entering the recreational vehicle, boat or the like.

To overcome the requirement of closing the closure during inclement weather, some in the prior art have provided air vent covers for covering the air vent device located in the roof of the recreational vehicle, boat or the like. Several air vent covers are shown in the following United States Patents.

U.S. Pat. No. 787,997 to R. Taylor et al. discloses a diffusion box having a flange adapted to be secured in position within the wall or other part of a car. An inner plate or door has return ends pivotally connected at its lower portion to the box. A series of recesses or depressions are located in an edge of one of the ends. A flat metal spring has one end secured to the upper portion of the box. The other end of the flat metal spring projects to cooperate with the recesses or depressions in the end portion of the plate or door.

U.S. Pat. No. 1,944,321 to W. L. C. Huxter discloses and automatic ventilator for exhausting foul air from vehicles comprising an upstanding stack adapted for mounting upon the vehicle and provided with an air passage communicating with the interior of the vehicle. A hood is pivotally mounted upon the stack and includes a cap portion normally seatable upon the top edge of the stack to close the air passage therethrough. A vane portion is associated with the cap portion and is disposed with respect to the normal wind of motion of the vehicle to be shiftable rearwardly by the impact of the air through which the vehicle moves and to effect to unseating of the cap portion with respect to this stack when the vehicle is in motion.

U.S. Pat. No. 2,460,604 to B. B. Simcox discloses a ventilator adapted to be tensionally and rotatably held in a circular hole in an enclosing wall of a vehicle. A cylindrical portion of flexible material has an outside dimension which is slightly larger than the hole in the vehicle wall and has a cut away portion extending from its inner end towards its outer end so that the inner end of the cylindrical portion can become pressed for insertion into the hole. A cap member closes the outer end of the cylindrical portion and has portions thereof extending outwardly beyond the outer surface of the cylindrical member. The cylindrical member has means projecting outwardly from its inner end for normally preventing the ventilator for moving entirely out of the hole. The cylindrical member has a projection intermediate its inner end and its exterior surface to prevent inward or out word movement of the ventilator relative to the enclosing wall except when the cylindrical member is compressed.

U.S. Pat. No. 3,934,383 to L. L. Perry et al. discloses an operating roof vent of plastic such as translucent resin for mounting in a vent opening of a roof. An inner one piece combination screen and garnish member telescopically mates with an outer one piece cowl member. A combination one piece cover and hinge closes the cowl member, with the hinge being secured to the cowl member to provide for swinging opening and closing of the cover.

U.S. Pat. No. 4,038,911 to A. C. Hart discloses a multi-directional vent for the ventilation opening of a vehicle including a vent frame having a vent cover pivoted at its front side to the frame and having an air intake opening in the front of the vent cover. A door is pivoted to the vent cover to selectively close or open the vent cover intake opening. Gear and bell crank operators are provided to pivot the cover about its hinge connection to the frame and to pivot the door about its hinge connection to the cover. The frame is screened and the operators extend through the screen to enable operation from inside the vehicle. With the door open and the vent cover closed a conventional scoop type operation is provided. With the door closed and the vent cover open a conventional pivoted ventilation operation is provided. With both the door and vent cover open ventilation is provided in all directions when the vehicle is at rest, and when in motion a venturi effect is achieved to extract air from the interior of the vehicle.

U.S. Pat. No. 4,615,263 to C. W. Titterud discloses a dry vent permiting ventilation of motor homes, travel trailers, or the like, while blocking entrance of rain and small animals through the ventilation duct. The dry vent hereof is especially designed for installation on existing ceiling ports, without modification of the port or the port cover. The dry vent includes a pair of opposed water-blocking sidewalls interconnected by a front structure comprising a pair of spaced apart louvres that define an inwardly, upwardly directed air passing channel.

U.S. Pat. No. 4,633,769 to S. A. Milks discloses a power roof vent fan assembly having a motor and fan mounted in a body spanning an opening in the roof of an enclosure. The motor is mounted in H-shaped cross brace assembly having reinforcing ribs for vibration dampening. A shroud is secured to the body which supports a screen and includes a trim flange which forms a pocket in conjunction with the body. A bezel is telescopically received within the pocket and secured to the lower surface of the roof. A cover is provided over the top end of the assembly which is hinged on one end and adapted to be opened and closed by a cover lifting mechanism located within the pocket. The fan motor is controlled by a speed control switch located within the pocket. The pocket in which the switch is retained includes ventilation openings for aiding heat dissipation from the switch.

U.S. Pat. No. 4,867,047 to M. Citron discloses a ventilator door and fan control assembly for use with a range hood which for use in a recreational vehicle wherein there is a plate associated with said ventilation door to open and close the door that is activated by a cable controlled by an operator handle mounted on the range hood within a switch holder and guide. The operator handle and the switch holder and guide are adapted to receive a conventional fan switch and simultaneously activate or deactivate a fan with the opening or closing of the ventilator door.

U.S. Pat. No. 5,020,425 to T. A. Kelly discloses a hingeless ventilator having a frame attachable to a wall of a compartment about an aperture therein, an opening in the frame alignable with the aperture. A closure member is swingable against a side of the frame for opening and closing the opening. A guide members is fixed to and instanding from an opposite side of the frame beyond opposite ends of the opening. A spring rod mounting is located on opposite ends composite rollers riding on the guide members and connected under tension to the closure member for selectively positioning the closure member relative to the frame. Each of the roller assemblies has an antifriction bushing journalled on the spring rod and in and bonded to an elastomeric collar engaging an adjoining guide member.

U.S. Pat. No. 5,054,377 to P. J. Mochel et al. discloses a recreational vehicle vent with a streamlined body having a forward fixed riser and a movable cover which, when closed, forms a smooth continuous aerodynamic surface together with the fixed riser. The cover is movably mounted to the vent frame by means of a pair of transversely extending crossed links at the front and a second independent pair of transversely extending crossed links at the back. The two link pairs are independently operated by geared actuators so that either the front of the cover or the back of the cover can be independently lifted or both can be lifted together.

U.S. Pat. No. 5,374,215 to B. D. Crider et al. discloses a vent cover for vehicles equipped with roof vents raisable and lowerable from within the vehicle by rotating a crank. The cover includes a dome formed by a top wall, sidewalls that depend from the top wall, and a venturi cone member secured to an underside of the top wall. A vent base mounted to the roof of the vehicle has upstanding sidewalls so that air molecules exiting the vehicle must flow upwardly to pass over the top of the sidewalls and then downwardly to enter the atmosphere external to the vehicle. The air molecules are forced to flow downwardly after they have passed over the top of the vent base sidewalls by the sidewalls that depend from the top wall of the dome. The cooperative shape of the venturi cone member, the walls that depend from the top wall of the dome, and the upstanding sidewalls of the vent base creates a constricted area above the upstanding sidewalls where upwardly flowing air molecules must change their path of travel to flow downwardly. The constriction forces the air molecules to flow at a high rate of speed, creating a venturi effect that efficiently pulls stale air, smoke, fumes, and the like out of the vehicle.

U.S. Pat. No. 5,797,791 to J. T. Humphrey et al. discloses a vented window assembly for any manner of vehicle or vessel. The window assembly has a unitary piece of glass with an opening defined therein. A vent assembly is mounted in the opening and is sealingly engaged with the glass. The vent assembly includes an operable vent which is selectively positioned between an opened position and a closed position. The vent is rotatable relative to the glass so that the vent can act as a forced air or exhaust vent.

U.S. Pat. No. 5,918,972 to P. D. Van Belle discloses a roof fixture for ventilating and illuminating the interior space of the vehicle or boat. The fixture includes a blower mounted over a ventilating opening in the roof. An outer cover is mounted to the exterior of the roof over the blower, thereby protecting the fixture and the interior of the vehicle from the elements. A mounting plate is attached to the interior of the roof over the ventilating opening. The central portion of the plate includes a plurality of exhaust openings and a recessed area which receives a lamp for illuminating the interior space. A plurality of damper flaps are attached to the exterior side of the plate, each flap overlying an exhaust opening. When the blower is on, the flaps lift upwardly to permit air flow from the interior space of the vehicle, through the exhaust openings, and out a vented portion of the cover.

U.S. Pat. No. 6,068,551 to G. A. Oremland discloses a trunk ventilating device that operates to elevate or reduce the temperature of the vehicle trunk or trunk-like area. The device will accommodate a conventional rear deck of an automobile and provides a sealing aspect between the occupant area and the trunk area with the use of louvers that are made operational upon demand by the vehicle operator. The vehicle operator may initiate a dash mounted control switch that operates a high speed fan capable of drawing air from the occupants seating area into the otherwise sealed trunk area providing the proposed temperature elevation or reduction. Louvers are gravity or spring biased. It includes an aperture covering so as to prevent items from entering the trunk or engaging the rotating fan. A separate embodiment encompasses the use of a remotely located fan for areas lacking a definable trunk area for the purpose of transferring conditioned air from one part of the vehicle to another. Transfer duct includes a fan without louvers for purposes of pushing conditioned air, such as from the foot well of the occupant's area to an otherwise unconditioned portion of the rear of the vehicle in either a temporary or permanent fashion.

U.S. Pat. No. 6,106,385 to J. T. Humphrey et al. discloses a vent assembly for any manner of vehicle or vessel. The vent assembly includes a vent which is operable between selective open positions and a closed position. The vent is rotatable relative to a panel through which the vent is disposed so that the vent can act as a forced air vent or exhaust vent.

U.S. Pat. No. 6,468,147 to M. D. Thomas discloses a vent cap cover for a recreational vehicle which allows for dry air entry during rainy conditions. The vent cap cover allows easy observation of the vent cap and maximum air and light availability. Easy maintenance, cleaning and repairs of the vent cap from the exterior of the RV is possible by simply opening the upper, transparent section of the vent cap cover.

The air vent covers solved the requirement of closing the closure of an air vent device during inclement weather to avoid precipitation form entering the recreational vehicle, boat or the like. Unfortunately, these air vent covers provided a large profile extending upwardly from the roof of the recreational vehicle, boat or the like.

Accordingly, it is an object of the present invention to provide an improved collapsible air vent closure that overcomes the problems of the prior art and provides a significant advantage to the ventilating art.

Another object of this invention is to provide an improved collapsible air vent closure having a closure that may remain open during inclement weather to avoid precipitation form entering the recreational vehicle, boat or the like.

Another object of this invention is to provide an improved collapsible air vent closure having a closure that may be moved to be generally parallel to the roof of the recreational vehicle, boat or the like to close the frame aperture when the closure was in the closed position.

Another object of this invention is to provide an improved collapsible air vent closure that presents a lower profile, a lower overall height and less wind resistance in the closed position than the non-collapsible air vents of the prior art.

Another object of this invention is to provide an improved collapsible air vent closure that is easy to install by an unskilled operator.

Another object of this invention is to provide an improved collapsible air vent closure that is economical to purchase and install.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

A specific embodiment of the present invention is shown in the attached drawings. For the purpose of summarizing the invention, the invention relates to an improved collapsible air vent closure for enabling the flow of air through a partition aperture defined in a partition. The collapsible air vent closure comprises a frame having a frame aperture with frame mount mounting the frame with the frame aperture communicating with the partition aperture. A closure is pivotably mounted by a closure pivot to the frame for pivoting the closure between a closed position and an open position. A vent wall defines a vent orifice interposed between the frame and the closure. A vent wall mounting movably mounts the vent wall for providing an air flow path between the vent orifice and the frame aperture and the partition aperture when the closure is in the open position. The closure inhibits the air flow path between the vent orifice and the frame aperture and the partition aperture when the closure is in the closed position.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 13 is a side sectional view of the collapsible air vent closure in an open position;

FIG. 14 is a side sectional view of the collapsible air vent closure in a closed position;

Similar reference characters refer to similar parts throughout the several Figures of the drawings.

DETAILED DISCUSSION

Figure 1:
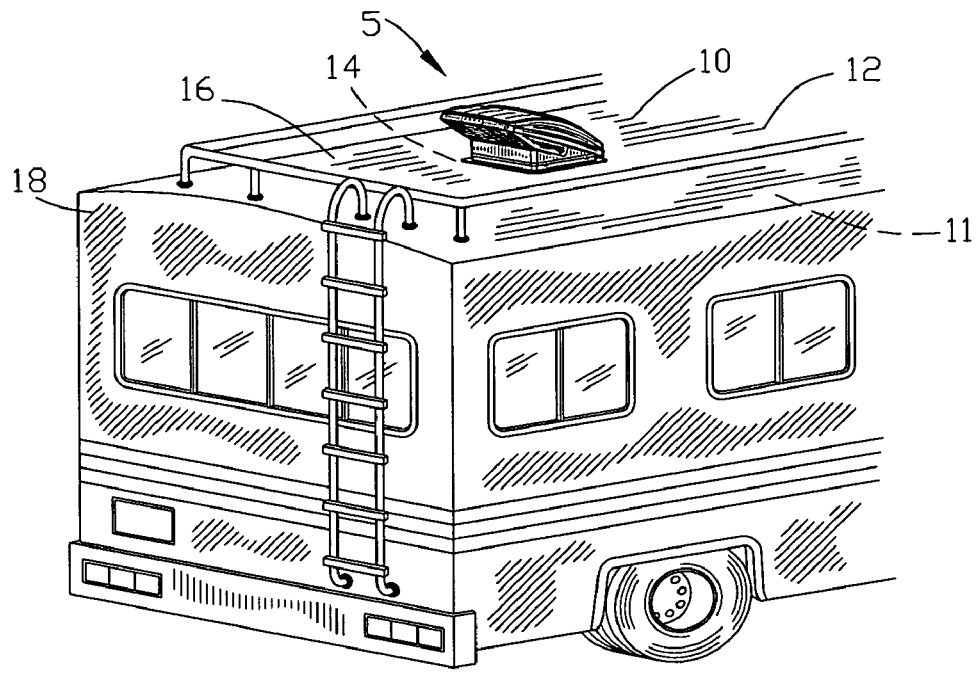
FIG. 1 is an isometric view of a collapsible air vent closure of the present invention shown in an open position on a roof of a recreational vehicle.

FIG. 1 is an isometric view of a collapsible air vent closure 5 of the present invention located on a partition 10 with collapsible air vent closure 5 shown in an open position. In the open position, the collapsible air vent closure 5 enables the flow of air between an inner side 11 and an outer side 12 of the partition 10 through a partition aperture 14 defined in the partition 10. In this example, the partition 10 is shown as a roof 16 of a structure 18 shown as a land vehicle 18. However, it should be understood that the partition 10 is only representative of one type of structure and it should be understood that the collapsible air vent closure 5 of the present invention may be used on various types of structures including fixed structures or moveable structures such as a recreational vehicle, a boat, a building structure or the like.

Figure 2:
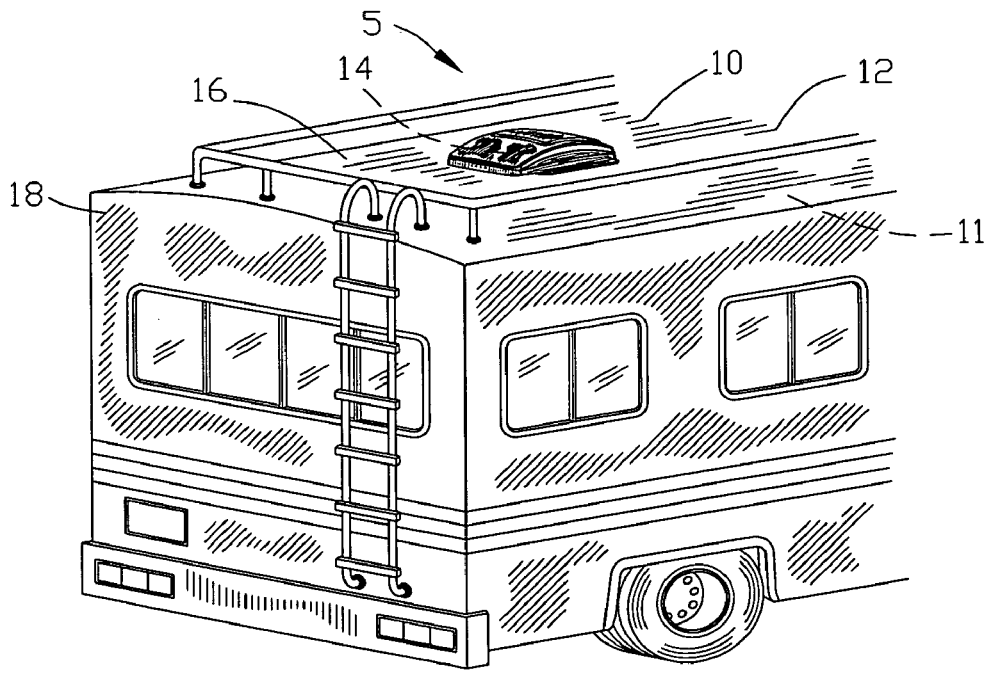
FIG. 2 is a view similar to FIG. 1 with the collapsible air vent closure shown in a closed position.

FIG. 2 is a view similar to FIG. 1 with the collapsible air vent closure 5 shown in a closed position. In the closed position, the collapsible air vent closure 5 inhibits the flow of air between the inner side 11 and the outer side 12 of the partition 10 through the partition aperture 14. Furthermore, the collapsible air vent closure 5 presents a lower profile, a lower overall height and less wind resistance in the closed position. The collapsible nature of the present invention provides a significant advantage and improvement over the non-collapsible air vents of the prior art.

Figure 3:
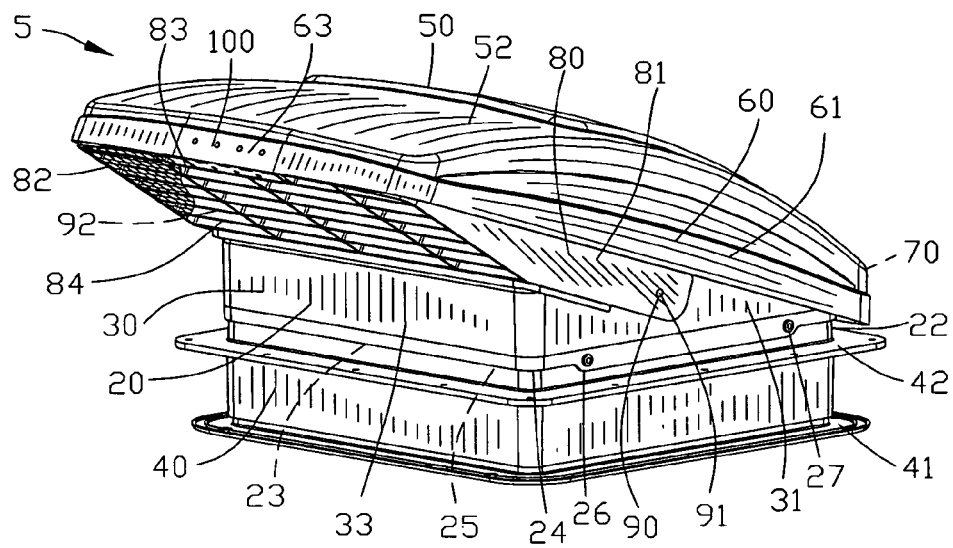
FIG. 3 is an enlarged isometric view of the collapsible air vent closure of the FIG. 1.
Figure 4:
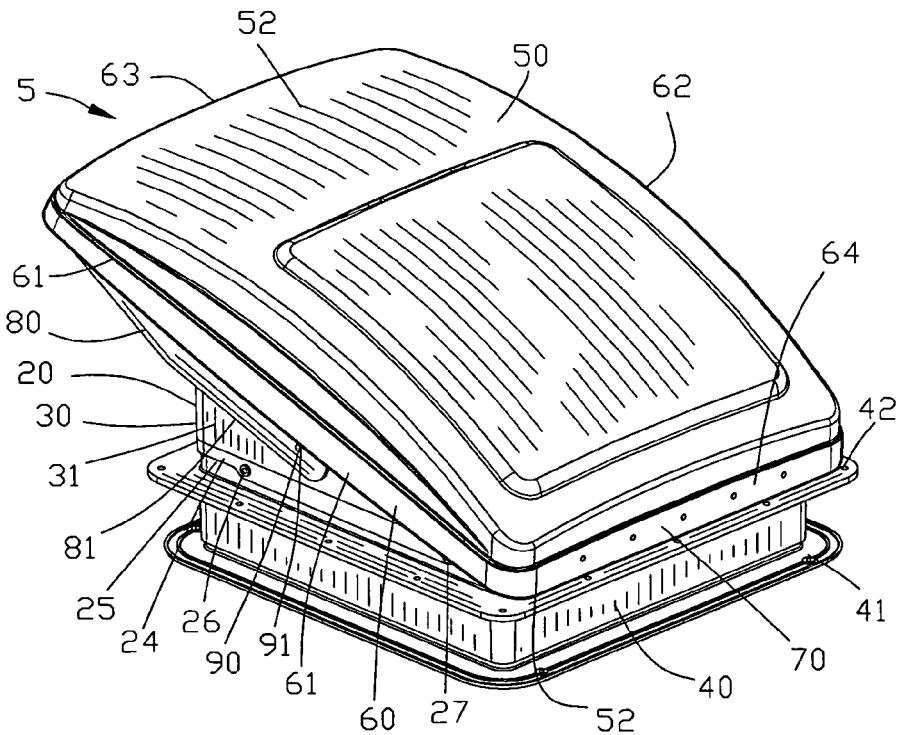
FIG. 4 is a front isometric view of the collapsible air vent closure of the FIG. 3.

FIGS. 3 and 4 are enlarged isometric views of the collapsible air vent closure 5 in the open position as shown in FIG. 1. The collapsible air vent closure 5 comprises a frame 20 having a frame aperture 23 defined within the frame 20 for permitting air flow therethrough. The frame 20 includes a frame base 24 for securing the frame 20 to a frame mount 40. The frame mount 40 mounts the frame 20 to the partition 10 with the frame aperture 23 communicating with the partition aperture 14 to allow air flow therethrough.

A closure 50 includes a closure wall 60 pivotably mounted to the frame 20 by a closure pivot 70. The closure 50 is pivotable between the open position as shown in FIG. 1 and the closed position as shown in FIG. 2. A vent wall 80 defines a vent orifice 84 for permitting air flow therethrough. The vent wall 80 is interposed between the frame 20 and the closure 50. A vent wall mounting 90 pivotable and slidably mounts the vent wall 80 relative to the frame 20. A coupling 100 interconnects the vent wall 80 to the closure 50 for moving the vent wall 80 upon movement of the closure 50.

The vent orifice 84 defined in the vent wall 80 enables an air flow between the inside 11 and the outside 12 surfaces of the recreational vehicle 18 when the closure 50 is moved into the open position. The air flow path between the inside 11 and the outside 12 surfaces of the recreational vehicle 18 extends from the vent orifice 84 through the frame aperture 23 to the partition aperture 14.

Figure 5:
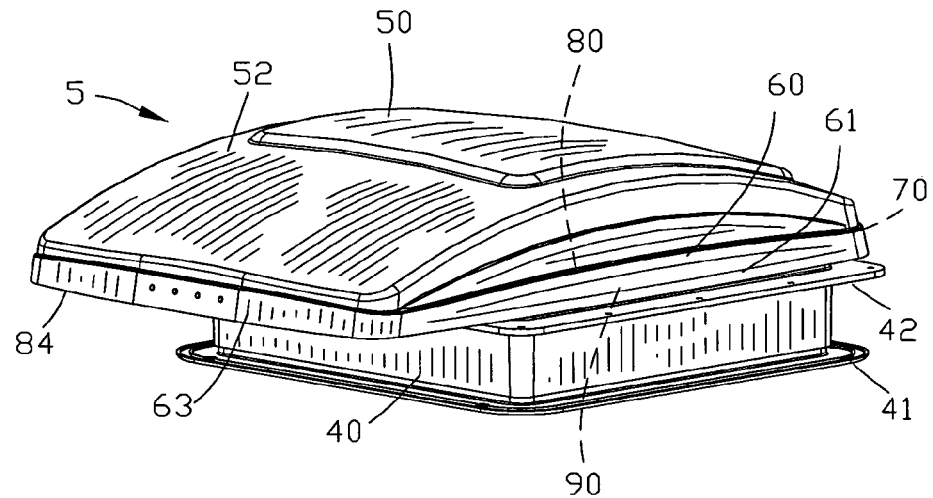
FIG. 5 is an enlarged isometric view of the collapsible air vent closure of the FIG. 2.
Figure 6:
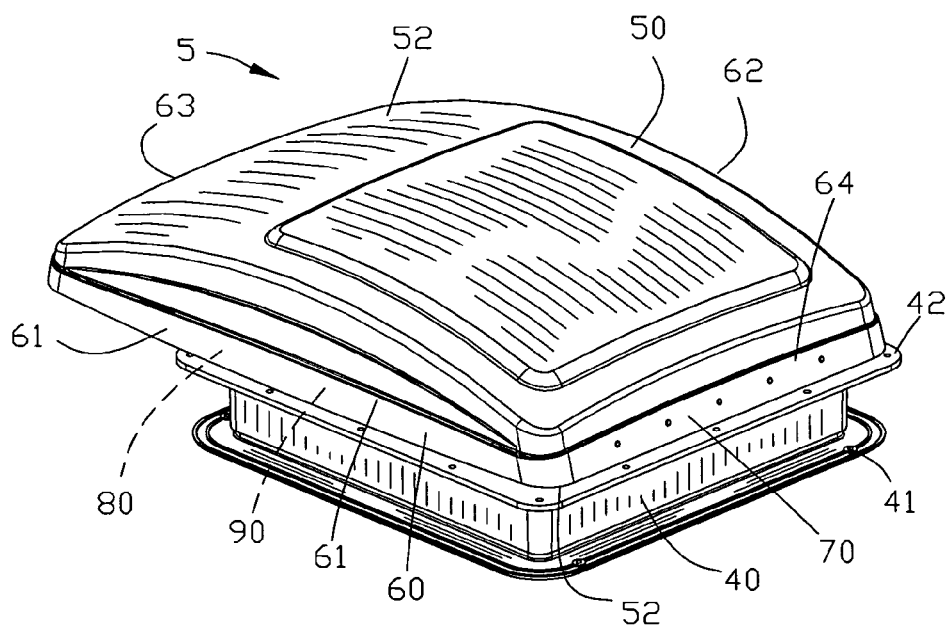
FIG. 6 is a front isometric view of the collapsible air vent closure of the FIG. 4.
Figure 7:
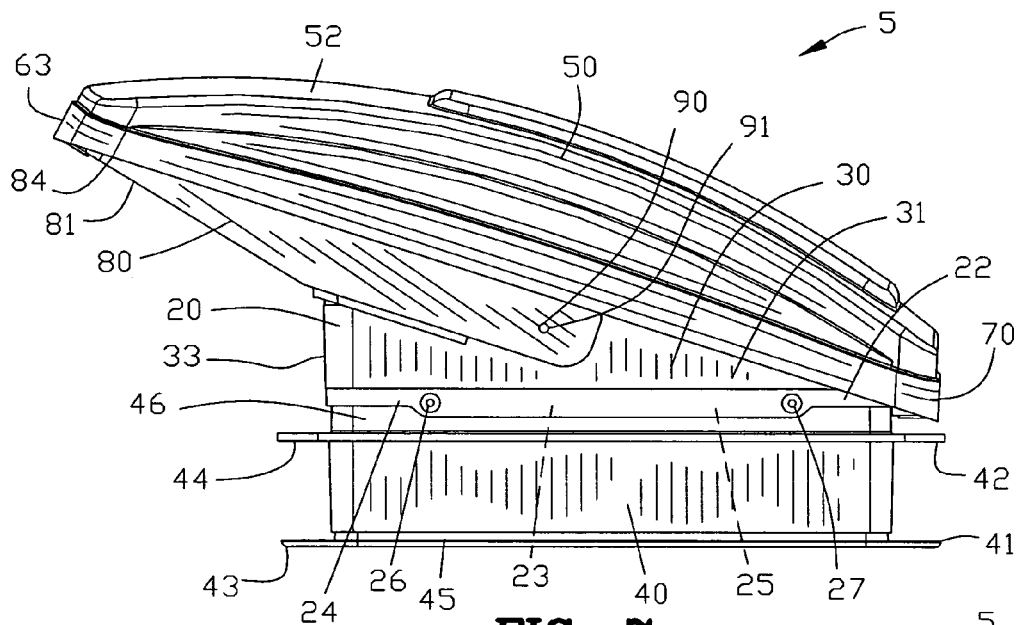
FIG. 7 is a side view of the collapsible air vent closure of FIG. 5.
Figure 8:
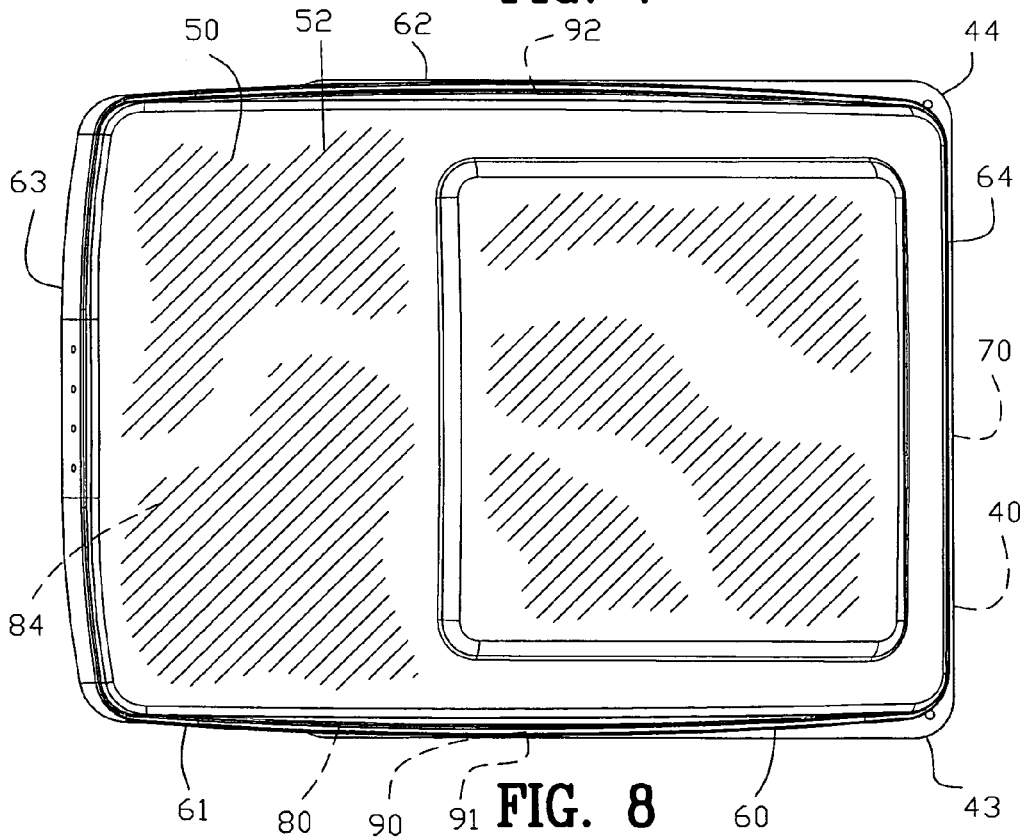
FIG. 8 is a top view of the collapsible air vent closure of FIG. 7.
Figure 9:
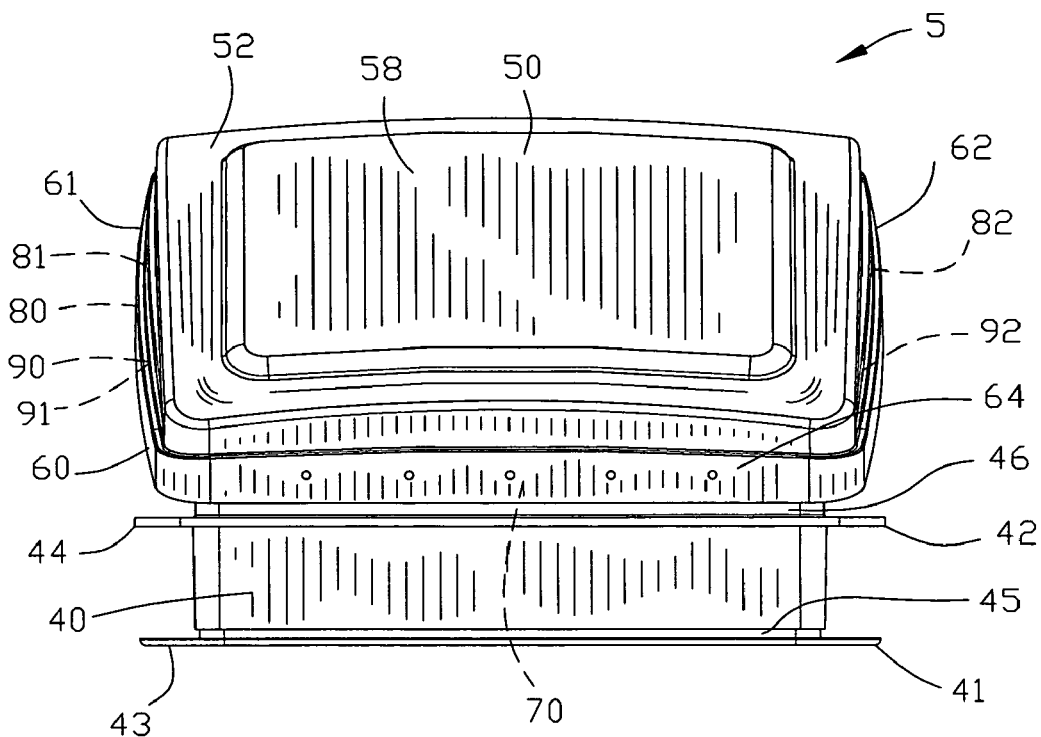
FIG. 9 is a front view of the collapsible air vent closure of FIG. 7.

FIGS. 5 and 6 are enlarged isometric views of the collapsible air vent closure 50 in the closed position as shown in FIG. 2. The closure 50 forms a seal with the frame 20 when the air vent closure 50 is in the closed position. The seal between the closure 50 and the frame 20 inhibits air flow between the inside 11 and the outside 12 surfaces of the recreational vehicle 18.

FIGS. 7–17 are various views of the collapsible air vent closure 5 of FIGS. 1–6. The frame mount 40 comprises an inner frame mount 41 and an outer frame mount 42 for engaging with the inner side 11 and the outer side 12 of the partition 10, respectively. The inner frame mount 41 has an inner flange 43 for mounting to the inner side 11 of the partition 10. The inner flange 43 supports an inner sleeve 45 to extend through the partition aperture 14 defined in the partition 10. The inner sleeve 45 defines a frame mounting aperture 47 for enabling air flow through the partition aperture 14 defined in the partition 10.

The outer frame mount 42 has an outer flange 44 for mounting to the outer side 12 of the partition 10. The outer flange 44 supports an outer sleeve 46 to extend from the outer side 12 of the partition 10. The outer sleeve 46 receives the inner sleeve 45 in a telescopic engagement. The telescopic engagement between the inner sleeve 45 and the outer sleeve 46 enables the frame mount 40 to accommodate for various thickness of the partition 10. After the inner sleeve 45 is secured to the inner side 11 of the partition 10, the inner sleeve 45 may be trimmed to be in accordance with the outer sleeve 46. The outer sleeve 46 defines a distal end 48 having a plurality of mounting holes 49.

The frame 20 defines a proximal end 21 and a distal end 22. The frame base 24 is disposed in proximity to the proximal end 21 of the frame 20. The frame base 24 comprises a groove 25 located on the proximal end 21 of the frame 20 and a plurality of holes 26 located adjacent to the groove 25.

The groove 25 is adapted to receive the distal end 48 of the outer sleeve 46 to position the collapsible air vent closure 5 upon the frame mount 40. When the collapsible air vent closure 5 is positioned upon the frame mount 40, the plurality of holes 26 of the frame 20 are aligned with the plurality of mounting holes 49 of the outer sleeve 46 of the frame mount 40. A plurality of threaded fasteners 27 extend through the plurality of aligned holes 26 and 49 and threadably engage with the inner flange 43 of the inner frame mount 41 for securing the frame 20 to the frame mounting 40. Although the frame base 24 has been shown to be secured to the frame mounting 40 by fasteners 27, it should be understood that various devices may be used for securing the frame 20 to the frame mounting 40.

The securing cooperation of the frame base 24 with the outer sleeve 46 facilitates the installation of the collapsible air vent closure 5 of the present invention. The inner frame mount 41 and the outer frame mount 42 may be secured independently to the inner side 11 and the outer side 12 of the partition 10. Thereafter, the collapsible air vent closure 5 may be positioned on the frame mount 40 and secured by the fasteners 27. The securing cooperation of the frame base 24 with the outer sleeve 46 enables the same collapsible air vent closure 5 to be used with frame mounting 40 having different sizes and/or shapes to accommodate for different sizes and/or shapes of the partition aperture 14.

The frame 20 comprises a frame wall 30 having sidewalls 31 and 32, an end wall 33 and a front wall 34. The frame wall 30 terminates in the distal end 22 of the frame 20. The distal end 35 of the frame wall 30 defines a frame sealing surface 36. Preferably, the frame sealing surface 36 includes a resilient gasket located on the distal end 22 of the frame wall 30.

The closure 50 has a closure base 52 defining a closure sealing surface 56. The closure base 52 may be provided with a transparent or translucent window 58 for enabling the transmission of light through the partition aperture 14 defined in the partition 10. The closure wall 60 extends from the closure base 52. The closure wall 60 comprises sidewalls 61 and 62 an end wall 63 and a front wall 64 extending from the closure base 52.

In this example, the closure wall 60 extends downwardly from the closure base 52 for covering the frame wall 30 when the closure 50 is in the closed position as shown in FIGS. 5 and 6. The closure sealing surface 56 engages with the frame sealing surface 36 for inhibiting the air flow path between the vent orifice 84 defined in the vent wall 80 and the frame aperture 23 and the partition aperture 14. The closure wall 60 covers the frame wall 30 to provide addition protection from inclement weather when the closure 50 is in the closed position.

Figure 15:
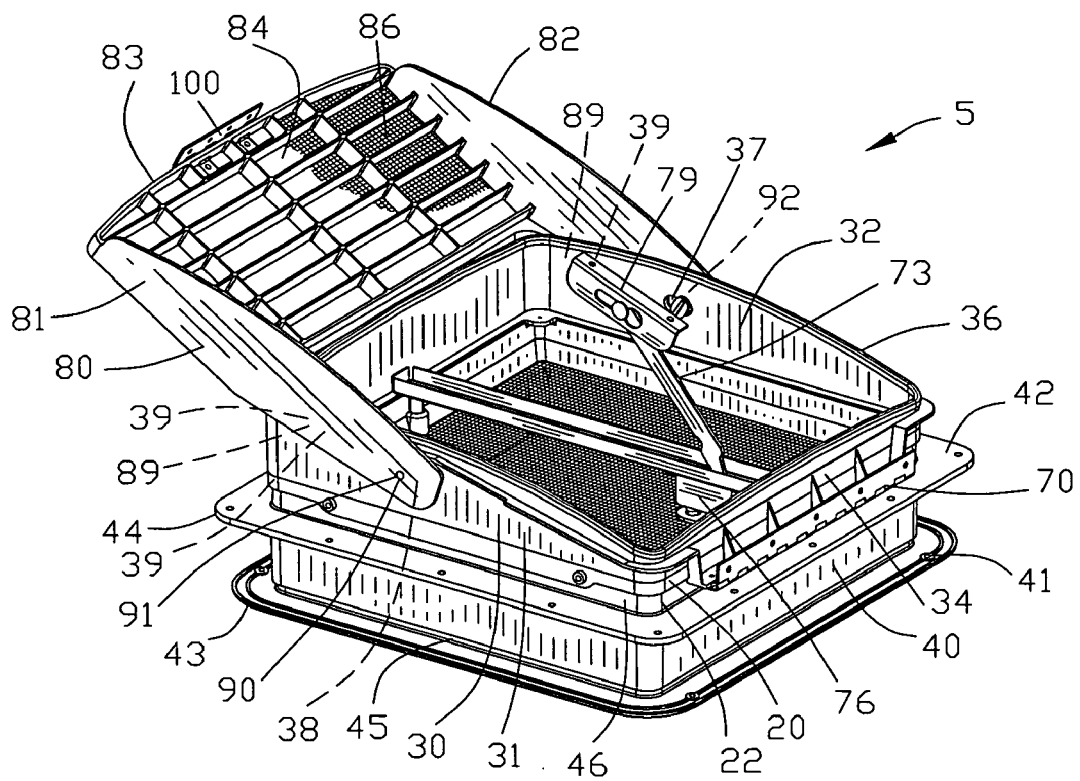
FIG. 15 is a top isometric view of the collapsible air vent closure in the open position with the closure being removed for purposes of illustration.
Figure 16:
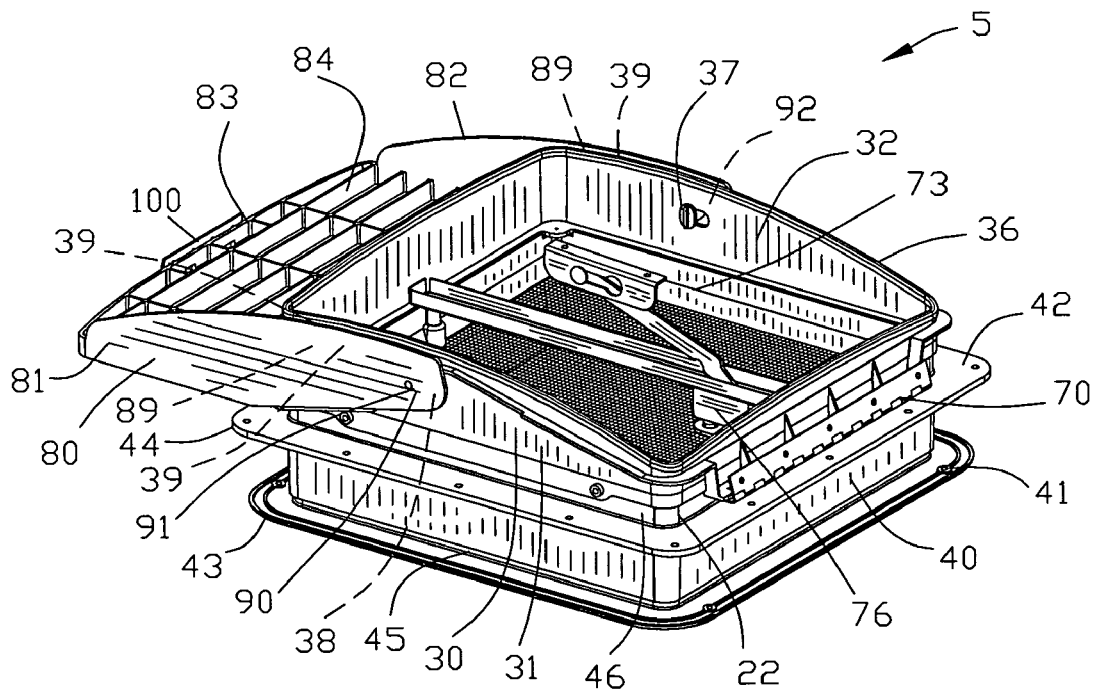
FIG. 16 is a top isometric view of the collapsible air vent closure in the closed position with the closure being removed for purposes of illustration.

FIGS. 15 and 16 are isometric views of the collapsible air vent closure 5 in the open position and the closed position with the closure 50 being removed from the drawing for the purpose of illustration. In this example, the closure pivot 70 is shown as a hinge for pivoting the closure 50 between the open position and the closed position.

The collapsible air vent closure 5 includes a mechanical drive 72 for pivoting the closure 50 between the open position and the closed position. In this example, the mechanical drive comprises an arm 73 connected to the closure 50 by a slotted bracket 79 located intermediate the sidewall 61 and 62 of the closure 50.

Figure 17:
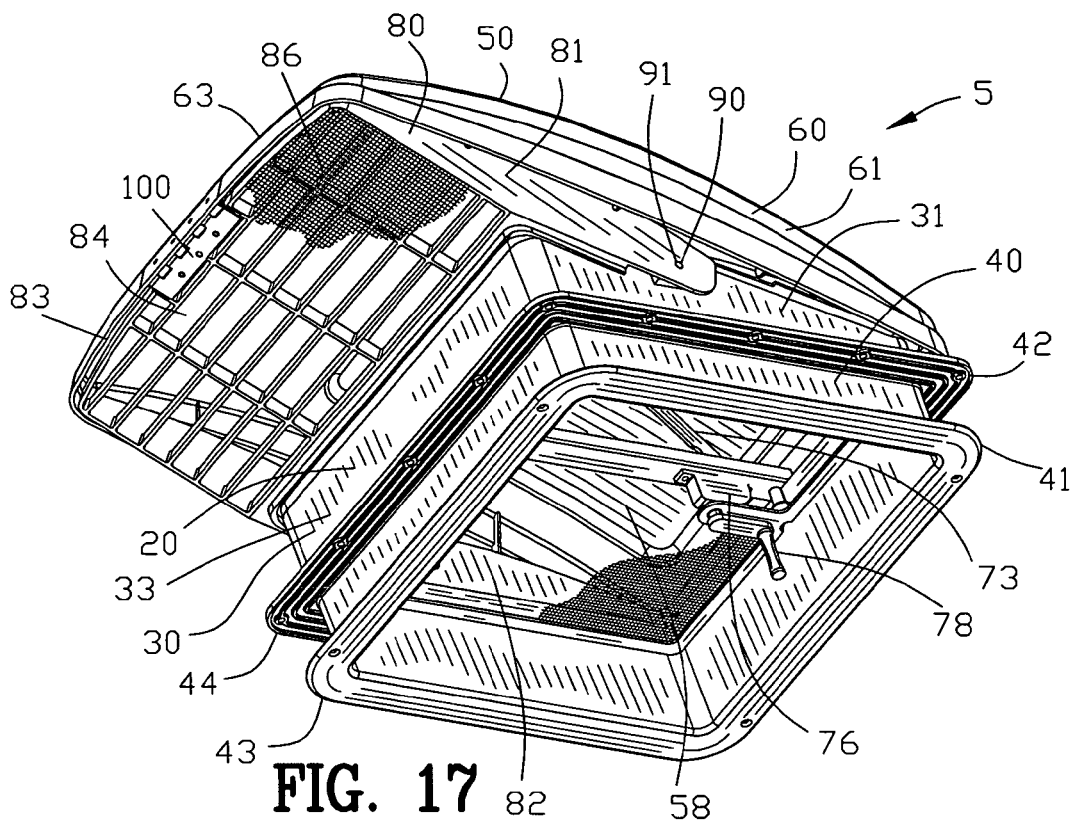
FIG. 17 is a bottom isometric view of the collapsible air vent closure in the open position.

FIG. 17 is a bottom isometric view of the collapsible air vent closure 5 in the open position. The arm 73 extends from a drive box 76 operated by a crank 78. The rotation of the crank 78 by an operator moves the closure 50 between the open position as shown in FIG. 13 and the closed position as shown in FIG. 14.

The vent wall 80 comprises a first and a second sidewall 81 and 82 with an endwall 83 interposed between the first and second sidewalls 81 and 82. The vent orifice 84 is defined in the vent endwall 83. In this example, the vent orifice 84 including a plurality of vent orifices defined in the vent endwall 83 for providing vent area commensurate with an area of the frame aperture 23. Preferably, the vent orifice 84 comprises a plurality of louvers for enabling air to pass through the vent orifice 84. A large mesh 86 is mounted in the vent orifice 84 to inhibit the intrusion of larger objects such as leaves, twigs, large insects, rodents and the like into the recreational vehicle 18.

The vent wall mounting 90 comprises the first and second sidewalls 81 and 82 being movably mounted relative to the frame 20. In this example, the vent wall mounting 90 comprises plural vent wall pivot pins 91 and 92 for pivotably mounting the vent wall 80 to the frame 20. The vent wall pivot pins 91 and 92 engage with elongated slots 37 and 38 defines in the sidewalls 31 and 32 of the frame wall 30. The plural vent wall pivot pins 91 and 92 cooperate with the elongated slots 37 and 38 for pivoting the vent wall 80 about a pivot axis substantially parallel to and spaced from the pivot axis of the closure pivot 70. The elongated slots 37 and 38 enable the plural vent wall pivot pins 91 and 92 to pivot about and to longitudinally move relative to the frame 20.

A coupling 100 interconnects the vent wall 80 with the closure 50 for moving the vent wall 80 in accordance with the pivoting of the closure 50. The coupling 100 interconnects the endwall 83 of the vent wall 80 with the endwall 63 of the closure 50. In this example, the coupling 100 is shown as a hinge interconnecting the vent wall 80 with the closure 50 for pivoting the vent wall 80 in accordance with the pivoting of the closure 50. The coupling 100 pivots the vent wall 80 about a pivot axis substantially parallel to and spaced from the pivot axis of the closure pivot 70 and the vent wall pivot pins 91 and 92.

The pivoting of the closure 50 on the closure pivot 70 results in a pivoting and a longitudinal movement of the vent wall 80. The pivoting of the closure 50 on the closure pivot 70 causes a rotational movement of the vent wall 80 about the coupling 100 relative to the closure 50. The pivoting of the closure 50 on the closure pivot 70 causes a combined rotational and linear movement of the vent wall pivot pins 91 and 92 relative to the frame 20. This combined rotational and linear movement is due in part to the spaced apart, parallel relationship between the pivot axis of the closure pivot 70 and the pivot axis of the vent wall pivot pins 91 and 92 and the pivot axis of the coupling 100.

Furthermore, the spaced apart, parallel relationship between the pivot axes enabling the closure 50 to be inclined relative to the frame 20 when the closure 50 is in the open and enables the closure 50 to be generally parallel relative to the frame 20 when the closure 50 is in the closed position. The generally parallel relationship between the frame 20 and the closure 50 presents a lower profile, a lower overall height and less wind resistance which is a significant advantage of the collapsible air vent closure 5 of the present invention.

Figure 10:
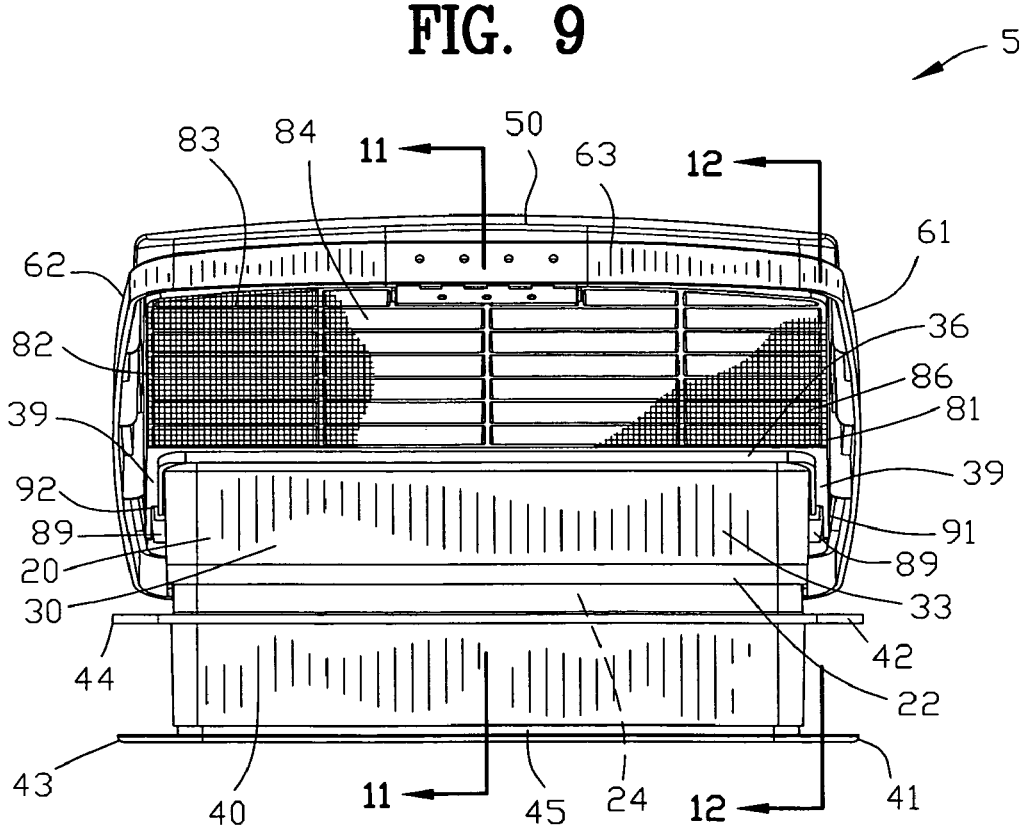
FIG. 10 is a rear view of the collapsible air vent closure of FIG. 7.
Figure 11:
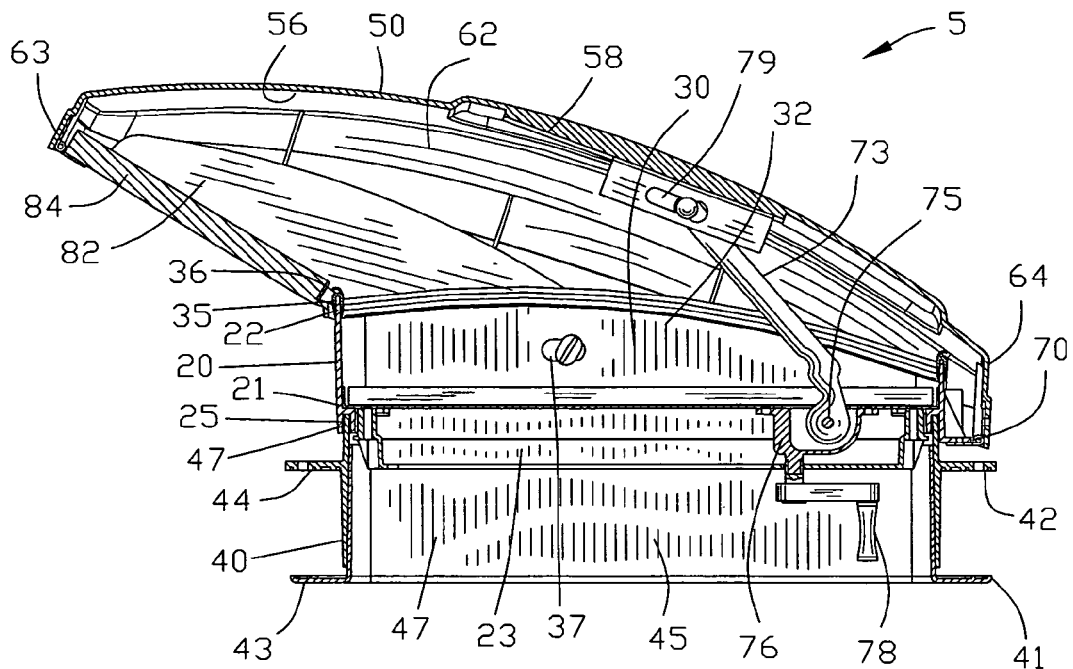
FIG. 11 is a side sectional view along line 11—11 in FIG. 10.
Figure 12:
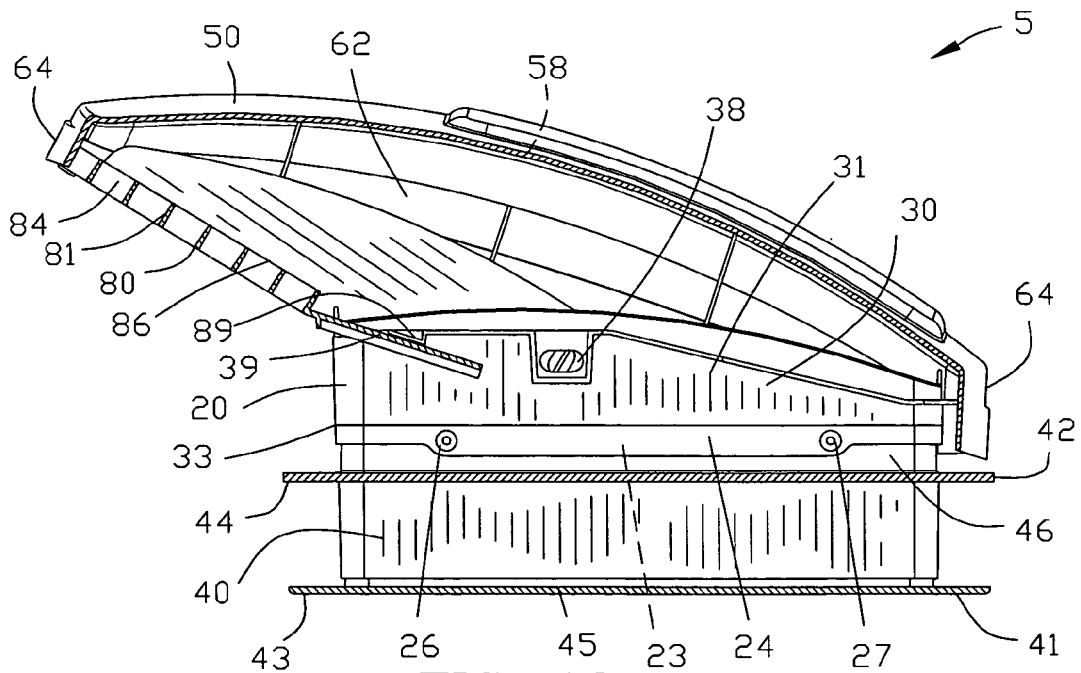
FIG. 12 is a side sectional view along line 12—12 in FIG. 10.

As best shown in FIGS. 10 and 12, plural stops 39 extend outwardly from the sidewalls 31 and 32 of the frame wall 20. Plural stops 89 extend inwardly from the sidewalls 81 and 82 of the vent wall 80. The plural stops 89 of the vent wall 80 engage with the plural stops 39 of the frame wall 20 to limit the opening movement of the vent wall 80 relative to the frame 20.

FIGS. 18–22 are various views of a second embodiment of the collapsible air vent closure 5A. The second embodiment of the collapsible air vent closure 5A is substantially similar to the first embodiment of the collapsible air vent closure 5 of FIGS. 3–17 with similar parts labeled with similar reference numeral.

Figure 18:
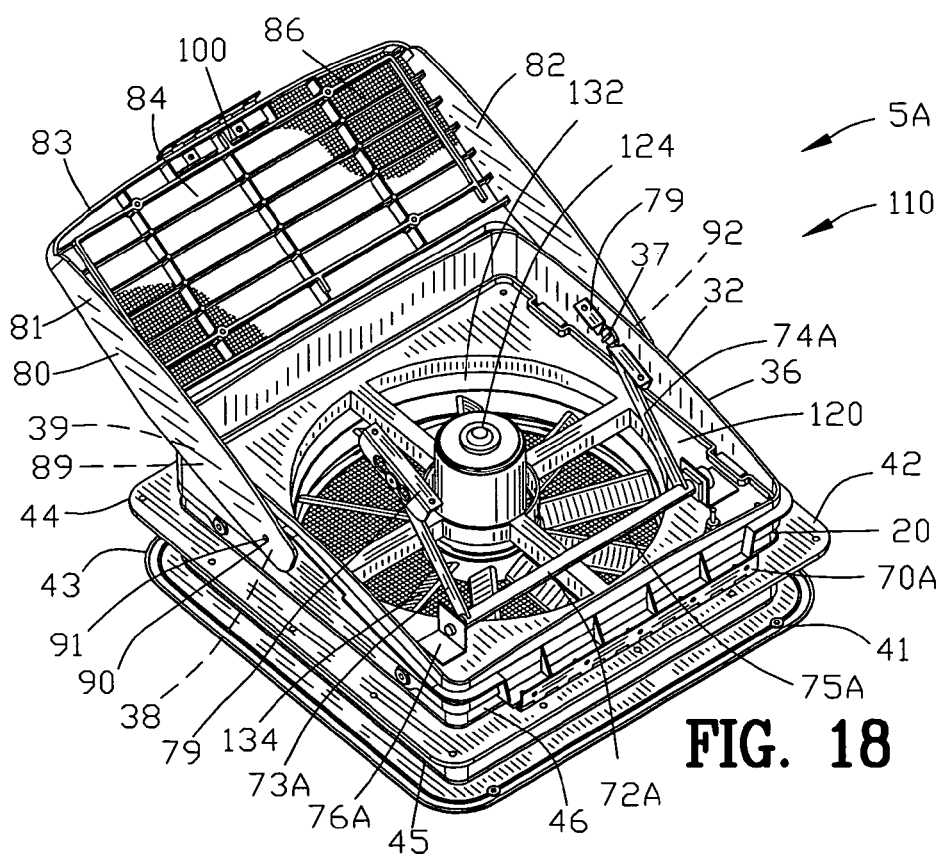
FIG. 18 is a top isometric view of a second embodiment of the collapsible air vent closure in the open position with the closure being removed for purposes of illustration.
Figure 19:
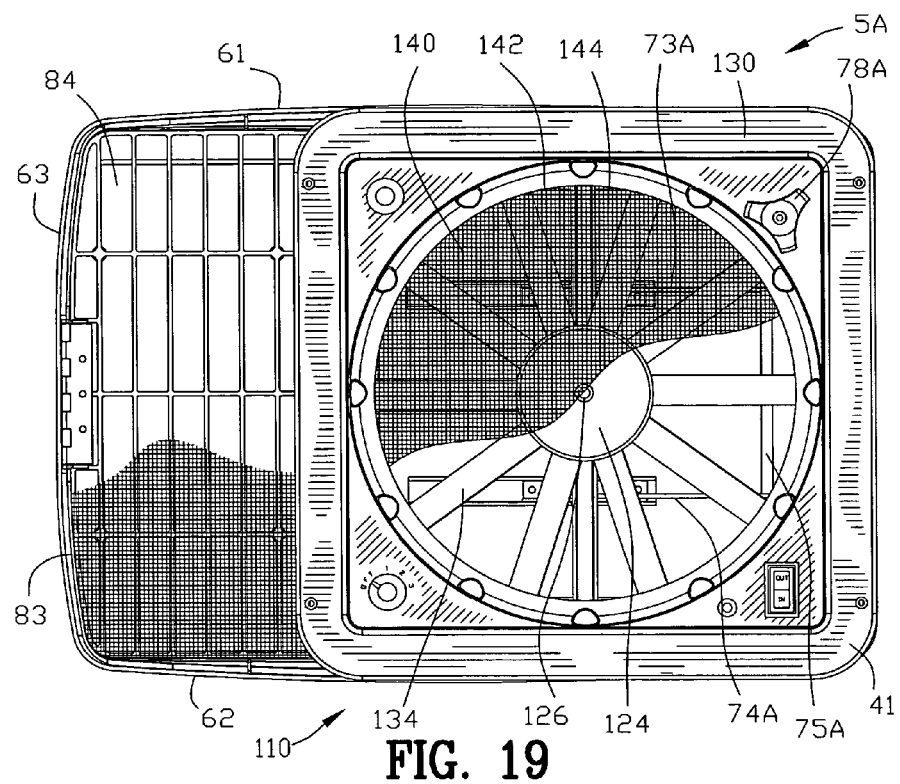
FIG. 19 is a bottom view of FIG. 18.

FIG. 18 is an isometric view of the collapsible air vent closure 5A in the open position with the closure 50 being removed from the drawing for the purpose of illustration. The closure pivot 70A includes a mechanical drive 72A for pivoting the closure 50A between the open position and the closed position.

In this example, the mechanical drive comprises plural arm 73A and 74A connected to the closure 50 by slotted brackets 79 located in proximity to the sidewall 61 and 62 of the closure 50. The plural arm 73A and 74A are secured to a rotatable shaft 75A extending through a drive box 76A operated by a crank 78A. The rotation of the crank 78A by an operator moves the closure 50 between the open position and the closed position. The plural arms 73A and 74A apply an equal force to opposed sidewalls 61 and 62 of the closure 50 as well as stabilize the closure 50 on the closure pivot 70A in both the open position and the closed position.

The collapsible air vent closure 5A includes an air unit 110. The air unit 110 comprises an upper horizontal support 120 secured to the frame 20. The upper horizontal support 120 defines a recess 122 for receiving an electric motor 124 having a motor shaft 126.

The air unit 110 comprises a lower horizontal support 130 secured to the upper horizontal support 120. The lower horizontal support 130 defines a circular aperture 132 for accommodating a fan blade 134. The fan blade 134 is secured to the motor shaft 126 for rotating the fan blade 134 within the circular aperture 132 in accordance with the rotation of electric motor 124.

Figure 20:
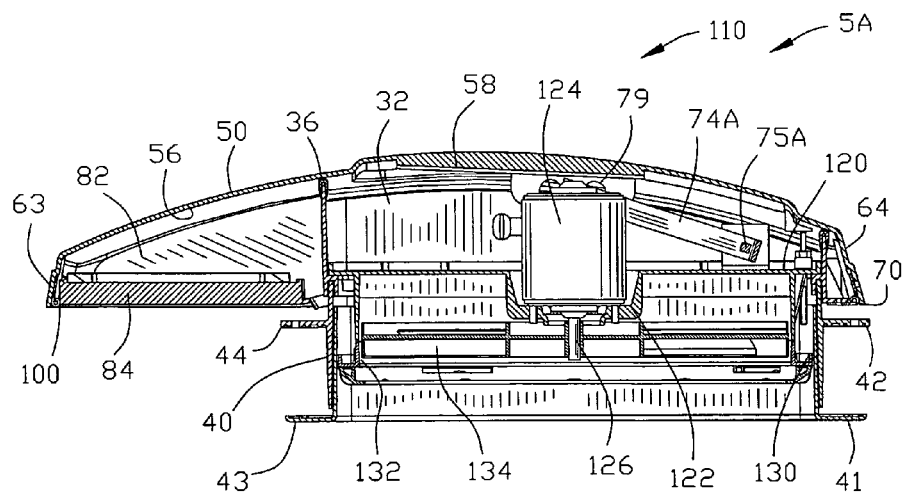
FIG. 20 is a side sectional view of the collapsible air vent closure of FIG. 18 in a closed position.
Figure 21:
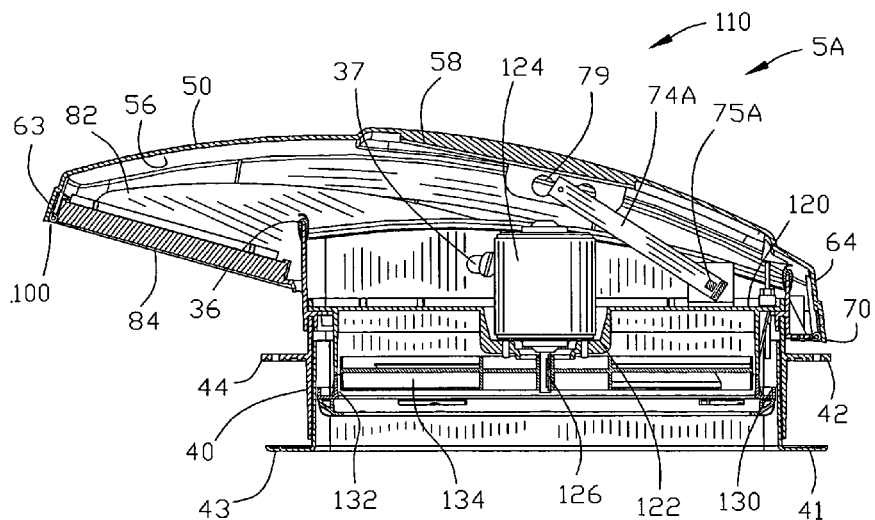
FIG. 21 is a side sectional view of the collapsible air vent closure of FIG. 18 in an intermediate position.
Figure 22:
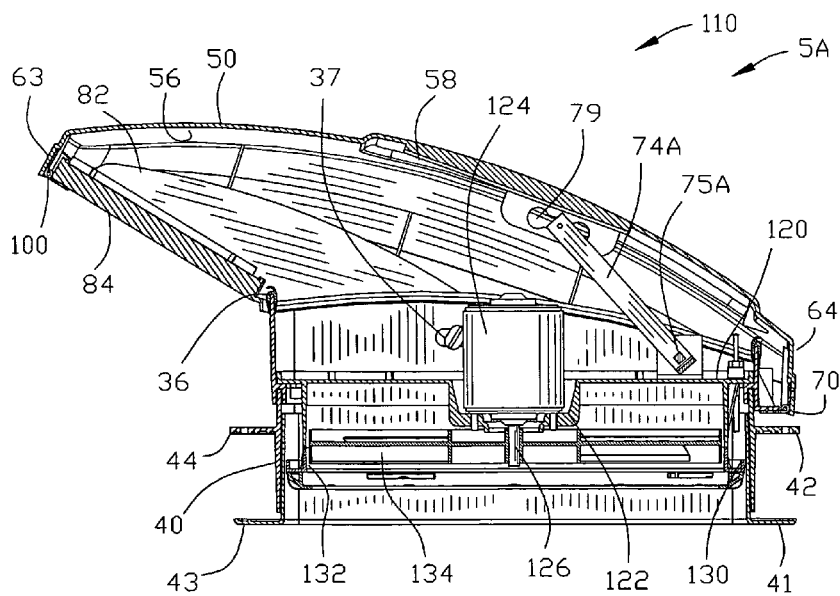
FIG. 22 is a side sectional view of the collapsible air vent closure of FIG. 18 in a fully open position.

FIGS. 20–22 are side sectional views of the collapsible air vent closure 5A in a closed position, an intermediate position, and a fully open position. The closure pivot 70A includes the slotted bracket 79 for receiving the arms 73A and 74A for moving the closure 50 between the open position and the closed position.

FIG. 20 is a side sectional view of the collapsible air vent closure 5A in a closed position.

In the closed position the closure sealing surface 56 engages with the frame sealing surface 36 for sealing the air vent closure 50 to the frame 20. The seal between the air vent closure 50 and the frame 20 inhibits the air flow path between the vent orifice 84 defined in the vent wall 80 and the frame aperture 23 and the partition aperture 14. The closure wall 60 overlaps and covers the frame wall 30 to provide addition protection from inclement weather.

FIG. 21 is a side sectional view of the collapsible air vent closure 5A in an intermediate position. The operation of the crank 78A moves the closure 50 from the closed position shown in FIG. 20 into the intermediate position shown in FIG. 21. The partial opening of the closure 50 permits air flow path between the vent orifice 84 and the partition aperture 14.

FIG. 22 is a side sectional view of the collapsible air vent closure 5A in a fully open position. A further operation of the crank 78 moves the closure 50 from the intermediate position shown in FIG. 21 into the fully open position shown in FIG. 22. The fully open position of the closure 50 permits maximum air flow path between the vent orifice 84 and the partition aperture 14. The engagements of the plural stops 89 of the vent wall 80 with the plural stops 39 of the frame 20 limits the fully open position of the closure 50.

Figure 23:
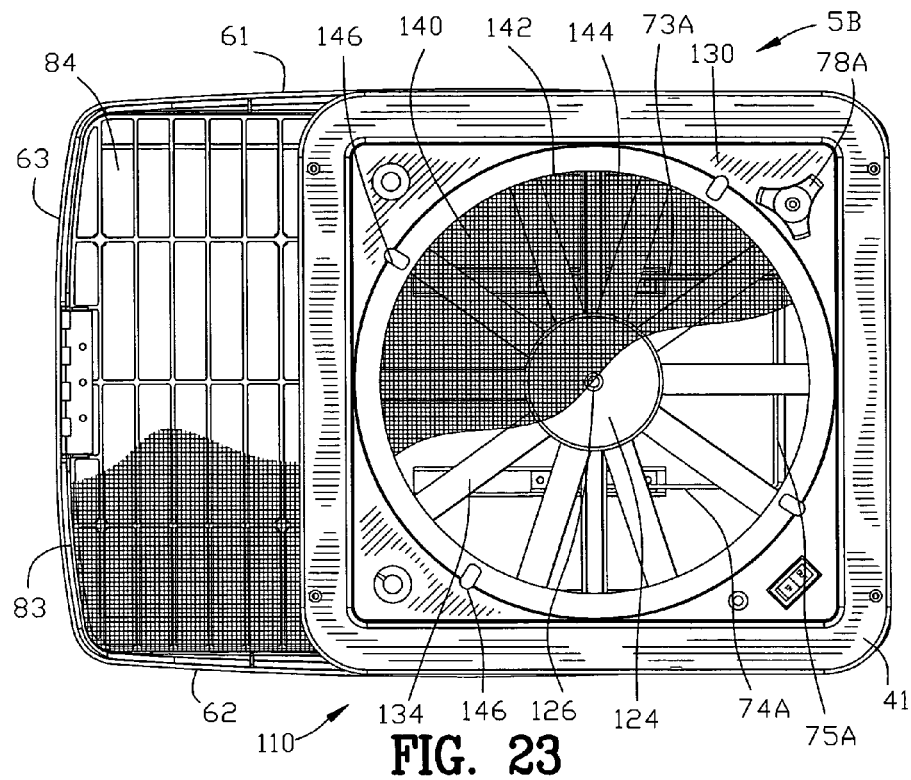
FIG. 23 is a bottom view similar to FIG. 19 illustrating a screen secured to the collapsible air vent closure.
Figure 24:
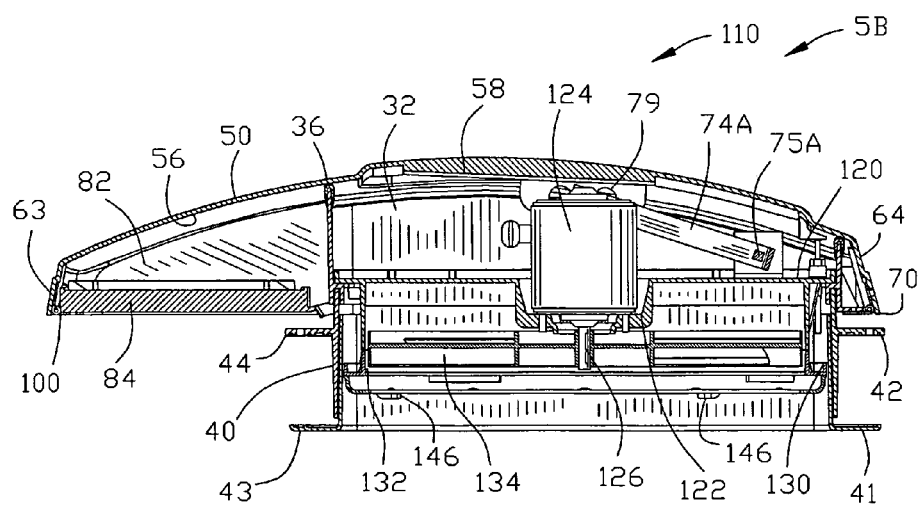
FIG. 24 is a side sectional view of the collapsible air vent closure of FIG. 23.

FIGS. 23 and 24 are bottom and side views of the collapsible air vent closure 5A illustrating a lower horizontal support 130 having a screen 140 secured thereto. The screen 140 comprises a peripheral frame 142 supporting a screen mesh 144. A plurality of rotatable tabs 146 extend outwardly from the peripheral frame 142 for securing the peripheral frame 142 to the lower horizontal support 130.

Preferably, the screen mesh 144 is finer than the large mesh 86 mounted in the vent orifice 84 to inhibit the intrusion of small objects such as small insects, knags, bugs, ants, mosquitoes and the like into the recreational vehicle 18. The screen 140 is removably mounted to the lower horizontal support 130 for cleaning, repair and the like.

Figure 25:
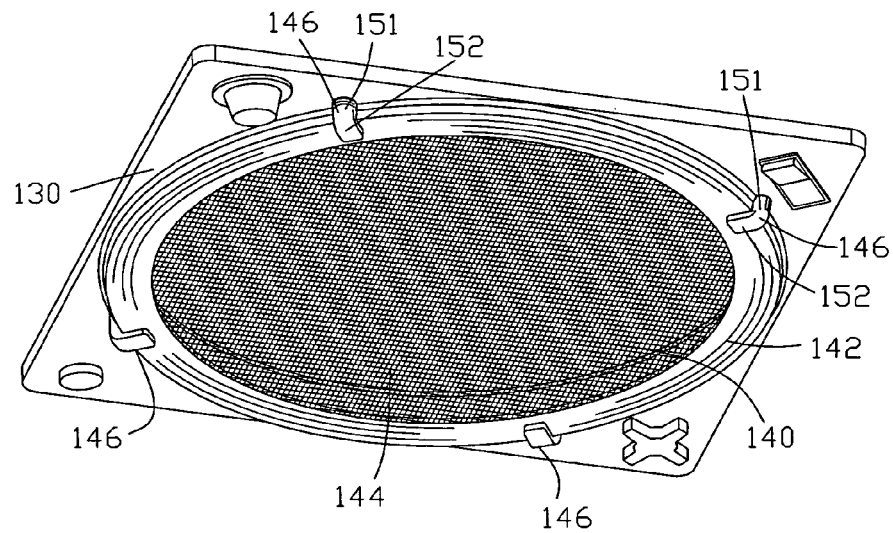
FIG. 25 is an enlarged bottom isometric view of the screen secured to the collapsible air vent closure.

FIG. 25 is an enlarged bottom isometric view of the screen 140 secured to the lower horizontal support 130 of the collapsible air vent closure 5A. Each of the rotatable tabs 146 includes a base 151 and a projection 151. The rotatable tabs 146 are rotatable about an axis extending through the base 151 for moving the projection into and out of engagement with the peripheral frame 142 of the screen 140.

Figure 26:
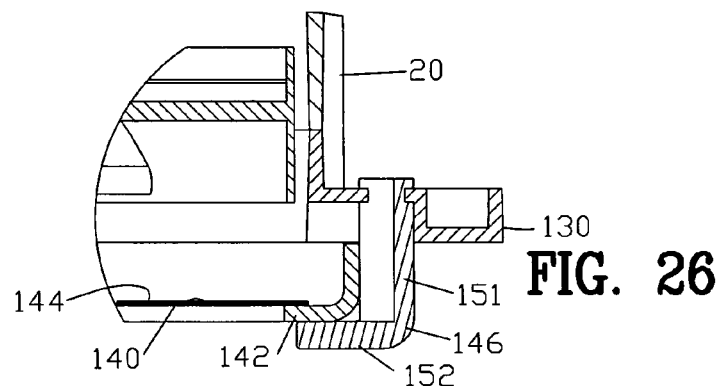
FIG. 26 is an enlarged side view of a portion of FIG. 25 illustrating a rotatable tab securing the screen to the lower horizontal support.

FIG. 26 is an enlarged side view of a portion of FIG. 25 illustrating the rotatable tab 146 securing the screen 140 of the lower horizontal support 130 of the of the collapsible air vent closure 5A. The rotatable tabs 146 is rotated about an axis extending through the base 151 for moving the projection into engagement with the peripheral frame 142 to secure the screen 140 to the lower horizontal support 130.

Figure 27:
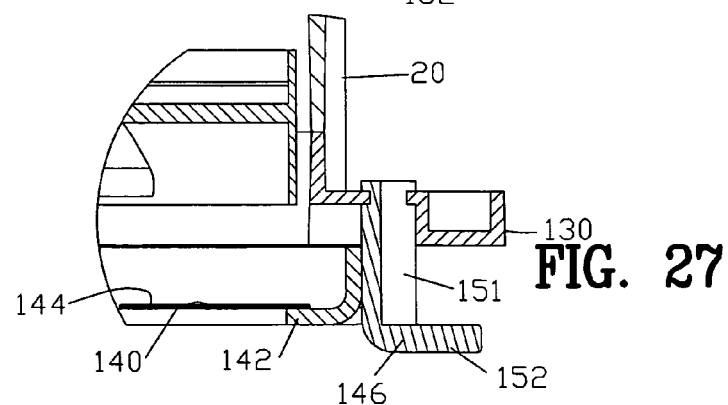
FIG. 27 is a view similar to FIG. 26 illustrating the rotatable tab releasing the screen from the lower horizontal support.

FIG. 27 is a view similar to FIG. 26 illustrating the rotatable tab 146 releasing the screen 140 from the lower horizontal support 130 of the lower horizontal support 130 of the of the collapsible air vent closure 5A. The rotatable tabs 146 is rotated about an axis extending through the base 151 for moving the projection out of engagement with the peripheral frame 142 to permit removal of the screen 140 from the lower horizontal support 130.

The present invention provides an improved collapsible air vent closure 5 having a closure 50 that may remain open during inclement weather to avoid precipitation form entering the recreational vehicle, boat or the like. The improved collapsible air vent closure 5 has a closure that may be moved to be generally parallel to the roof of the recreational vehicle, boat or the like to close the frame aperture 23 when the closure 50 is in the closed position. The improved collapsible air vent closure 5 presents a lower profile, a lower overall height and less wind resistance in the closed position than the non-collapsible air vents of the prior art.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A collapsible air vent closure for enabling the flow of air through a partition aperture defined in a partition, comprising;
    a frame having a frame aperture;
    a frame mount mounting said frame with said frame aperture communicating with the partition aperture;
    a closure;
    a closure pivot pivotably mounting said closure to said frame for pivoting said closure between a closed position and an open position;
    a vent wall comprising a sidewall and an endwall defining a vent orifice interposed between said frame and said closure;
    a vent wall mounting for movably mounting said vent wall;
    a coupling fixed to said closure and interconnected with said vent wall for moving
    said vent wall in accordance with the pivoting of said closure;
    said vent wall providing an air flow path between said vent orifice and said frame aperture and the partition aperture when said closure is in said open position; and
    said closure inhibiting said air flow path between said vent orifice and said frame aperture and the partition aperture when said closure is in said closed position.

2. A collapsible air vent closure as set forth in claim 1, wherein said frame comprises a frame base disposed about said frame aperture with a frame wall extending from said frame base.

3. A collapsible air vent closure as set forth in claim 1, wherein said frame comprises a frame base disposed about said frame aperture with a frame wall extending from said frame base; and
    a distal end of said frame wall defining a frame sealing surface.

4. A collapsible air vent closure as set forth in claim 1, wherein said frame mount comprises an inner frame mount and an outer frame mount for engaging with an inner side and an outer side of the partition, respectively.

5. A collapsible air vent closure as set forth in claim 1, wherein said frame mount comprises an inner frame mount and an outer frame mount for engaging with an inner side and an outer side of the partition, respectively; and
   said inner and outer frame mounts forming a telescopic engagement therebetween for accommodating for various thickness of the partition.

6. A collapsible air vent closure as set forth in claim 1, wherein said frame mount comprises an inner frame mount and an outer frame mount for engaging with an inner side and an outer side of the partition, respectively; and
   said frame mount extending from said outer side of the partition for affixing to said frame.

7. A collapsible air vent closure as set forth in claim 1, wherein said closure has a closure base and closure walls extending from said closure base.

8. A collapsible air vent closure as set forth in claim 1, wherein said closure comprises a closure wall extending from said closure base with said closure base defining a closure sealing surface.

9. A collapsible air vent closure as set forth in claim 1, wherein said closure pivot interconnects said closure to said frame for enabling said closure to be inclined relative to the partition when said closure is in said open position and for enabling said closure to be generally parallel relative to the partition when said closure is in said closed position.

10. A collapsible air vent closure as set forth in claim 1, wherein said closure pivot includes a mechanical drive for pivoting said closure between said open position and said closed position.

11. A collapsible air vent closure as set forth in claim 1, wherein said closure pivot includes a mechanical drive for pivoting said closure between said open position and said closed position; and
    said mechanical drive comprises plural arm located adjacent to opposed wall of said closure for applying a pivoting force to opposed sides of said closure.

12. A collapsible air vent closure for enabling the flow of air through a partition aperture defined in a
    partition, comprising;
    a frame having a frame aperture;
    a frame mount mounting said frame with said frame aperture communicating with the partition aperture;
    said frame comprising a frame base with a frame wall extending from said frame base;
    a closure;
    a closure pivot pivotably mounting said closure to said frame for pivoting said closure between a closed position and an open position;
    said closure comprising a closure base with a closure wall extending from said closure base;
    a vent wall comprising a first and a second sidewall with an endwall interposed therebetween;
    a vent orifice defined in said endwall;
    a vent wall mounting for movably mounting said first and second sidewalls and said endwall of said vent wall outside of said frame wall and inside of said closure wall for providing an air flow path between said vent orifice and said frame aperture and the partition aperture when said closure is in said open position;
    said first and second sidewalls of said vent wall directing said airflow path between said closure and said frame to extend through said vent orifice; and
    said closure inhibiting said air flow path between said vent orifice and said frame aperture and the partition aperture when said closure is in said closed position.

13. A collapsible air vent closure as set forth in claim 1, wherein said frame comprises a frame base with a frame wall extending from said frame base defining a frame sealing surface;
    said closure comprising a closure base defining a closure sealing surface; and
    said closure sealing surface engaging with said frame sealing surface for inhibiting said air flow path between said wall orifice and said frame aperture and the partition aperture when said closure is in said closed position.

14. A collapsible air vent closure as set forth in claim 1, wherein said vent wall comprises a first and a second sidewall with an endwall interposed therebetween; and
    said vent orifice including a plurality of vent orifices defined in said vent endwall for providing vent area commensurate with an area of said frame aperture.

15. A collapsible air vent closure as set forth in claim 1, wherein said vent wall comprises a first and a second sidewall with an endwall interposed therebetween; and
    said vent wall mounting comprising said first and second sidewalls being movably mounted relative to said frame.

16. A collapsible air vent closure as set forth in claim 1, wherein said vent wall comprises a first and a second sidewall with an endwall interposed therebetween; and
    said vent wall mounting comprising said first and second sidewalls being pivotably mounted to said frame.

17. A collapsible air vent closure as set forth in claim 1, including a coupling for interconnecting said vent wall with said closure for moving said vent wall in accordance with the pivoting of said closure.

18. A collapsible air vent closure as set forth in claim 1, wherein said vent wall mounting comprises a vent wall pivot for pivotably mounting said vent wall to said frame; and
    a coupling for interconnecting said vent wall with said closure for pivoting said vent wall in accordance with the pivoting of said closure.

19. A collapsible air vent closure as set forth in claim 1, wherein said vent wall mounting comprises a vent wall pivot for pivotably mounting said vent wall to said frame;
    said vent wall pivot being substantially parallel to and spaced apart from said closure pivot; and
    a coupling for interconnecting said vent wall with said closure for pivoting said vent wall in accordance with the pivoting of said closure.

20. A collapsible air vent closure for enabling the flow of air through a partition aperture defined in a partition, comprising;
    a frame having a frame aperture mounted to the partition with said frame aperture communicating with the partition aperture;
    a closure for covering said frame aperture;
    a closure pivot for pivotably mounted to said frame for pivoting said closure between a closed position and an open position;
    a vent wall comprising a sidewall and an endwall with said endwall defining a vent wall orifice;
    a vent wall mounting for moveably mounting said sidewall and an endwall of said vent wall for directing said airflow path between said closure and said frame to extend through said vent orifice; and said sidewall of said vent wall directing said airflow path between said closure and said frame to extend through said vent orifice; and said closure inhibiting said air flow path between said vent wall orifice and the partition aperture when said closure is in said closed position.

21. A collapsible air vent closure for enabling the flow of air through a partition aperture defined in a partition, comprising;

a frame having a frame aperture;

a frame mount mounting said frame with said frame aperture communicating with the partition aperture;

a closure;

a closure pivot pivotably mounting said closure to said frame for pivoting said closure between a closed position and an open position;

a generally U-Shape vent wall comprising a first and a second sidewall with an endwall interposed therebetween;

a vent orifice defined in said endwall;

a vent wall mounting for movably mounting said first and second sidewalls and said endwall of said vent wall for providing an air flow path between said vent orifice and said frame aperture and the partition aperture when said closure is in said open position;

said first and second sidewalls of said vent wall directing said airflow path between said closure and said frame to extend through said vent orifice; and said closure inhibiting said air flow path between said vent orifice and said frame aperture and the partition aperture when said closure is in said closed position.

22. A collapsible air vent closure for enabling the flow of air through a partition aperture defined in a partition, comprising;

a frame comprising a frame wall having first and second sidewalls, an end wall and a front wall defining a frame aperture;

a frame aperture;

a frame mount mounting said frame with said frame aperture communicating with the partition aperture;

a closure;

a closure pivot pivotably mounting said closure to said frame for pivoting said closure between a closed position and an open position;

a vent wall comprising a first and a second sidewall with an endwall interposed therebetween;

a vent orifice defined in said endwall;

a vent wall mounting for movably mounting said first and second sidewalls of said vent wall to said first and second sidewalls of said frame wall for providing an air flow path between said vent orifice and said frame aperture and the partition aperture when said closure is in said open position;

said first and second sidewalls of said vent wall directing said airflow path between said closure and said frame to flow through said vent orifice; and said closure inhibiting said air flow path between said vent orifice and said frame aperture and the partition aperture when said closure is in said closed position.

* * * * *